(12) United States Patent
Ciampolini et al.

(10) Patent No.: US 8,968,501 B2
(45) Date of Patent: Mar. 3, 2015

(54) METHOD FOR BUILDING MAGNETIC CORE INCLUDING LAMINATIONS BOUND INTO PACKS FOR ELECTRICAL MACHINE

(75) Inventors: Franco Ciampolini, Bologna (IT);
Vincenzo Giorgianni, Forli (IT);
Patrick Giuliani, Castelfranco Emilia (IT)

(73) Assignee: Magneti Marelli S.p.A., Corbetta (IT)

( * ) Notice: Subject to any disclaimer, the term of this patent is extended or adjusted under 35 U.S.C. 154(b) by 419 days.

(21) Appl. No.: 13/370,361

(22) Filed: Feb. 10, 2012

(65) Prior Publication Data
US 2012/0205026 A1    Aug. 16, 2012

(30) Foreign Application Priority Data

Feb. 10, 2011    (IT) .............................. BO2011A0058

(51) Int. Cl.
*B29C 65/48*    (2006.01)
*H02K 15/02*    (2006.01)

(52) U.S. Cl.
CPC ...................................... *H02K 15/02* (2013.01)
USPC .......... 156/64; 29/596; 29/598; 310/216.045; 310/216.046; 310/216.048; 310/216.061; 310/216.062; 310/216.065

(58) Field of Classification Search
CPC ........ B29C 43/58; B29C 65/48; B32B 37/12; B32B 38/00; B32B 41/00; H02K 15/02
USPC ................ 156/64; 29/596, 598; 310/216.045, 310/216.046, 216.048, 216.061, 216.062, 310/216.065
See application file for complete search history.

(56) References Cited

U.S. PATENT DOCUMENTS

| 4,007,867 A | 2/1977 | Wielt et al. |
| 4,073,373 A | 2/1978 | Crowley et al. |

(Continued)

FOREIGN PATENT DOCUMENTS

| EP | 0278200 A1 | 8/1988 |
| EP | 0355778 A2 | 2/1990 |

(Continued)

OTHER PUBLICATIONS

Dec. 2, 2011 Search Report for Italian Patent App. No. B020110058.
Mar. 20, 2012 European Search Report for Patent App. No. EP 12 15 5004.

*Primary Examiner* — George Koch
(74) *Attorney, Agent, or Firm* — Howard & Howard Attorneys PLLC

(57) ABSTRACT

A method for building a magnetic core including laminations bound into packs for an electrical machine comprises steps of: stacking a group of laminations one on top of the other to build the core; binding into a pack the group building the core by locking members that axially compress the group with a predetermined clamping force; pre-compressing, before clamping the pack by the locking members, the group by a pre-compression press that is independent and separate from the locking members; measuring an axial length of the group while the group is being compressed by the pre-compression press; initially forming the group with a normally lacking number of laminations to initially have the measured length that is lower than or substantially equal to a desired length; and adding, after having completed pre-compression, an additional number of laminations to the group determined according to a difference between the desired and measured lengths.

10 Claims, 3 Drawing Sheets

(56) References Cited

U.S. PATENT DOCUMENTS

Figure 3:
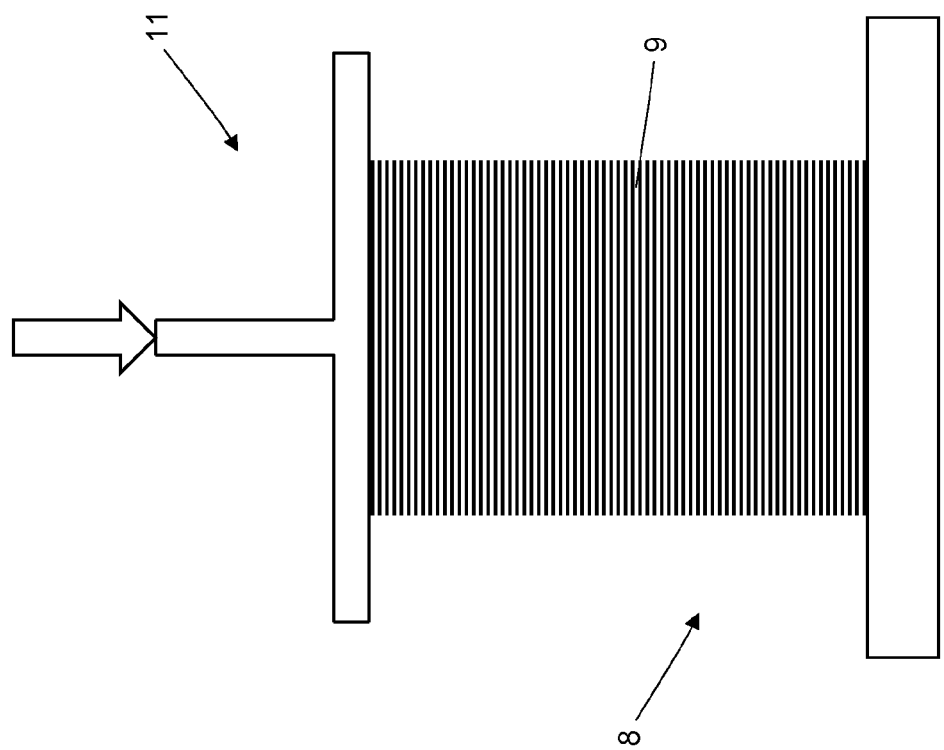

| | | |
|---|---|---|
| 4,079,512 A | 3/1978 | Lakes |
| 6,507,990 B1 | 1/2003 | Moreno et al. |
| 2010/0154968 A1 | 6/2010 | Shirai et al. |

FOREIGN PATENT DOCUMENTS

| | | | |
|---|---|---|---|
| JP | 59106860 | | 6/1984 |
| JP | 07115756 A | * | 5/1995 |
| WO | 9914839 | | 3/1999 |

* cited by examiner

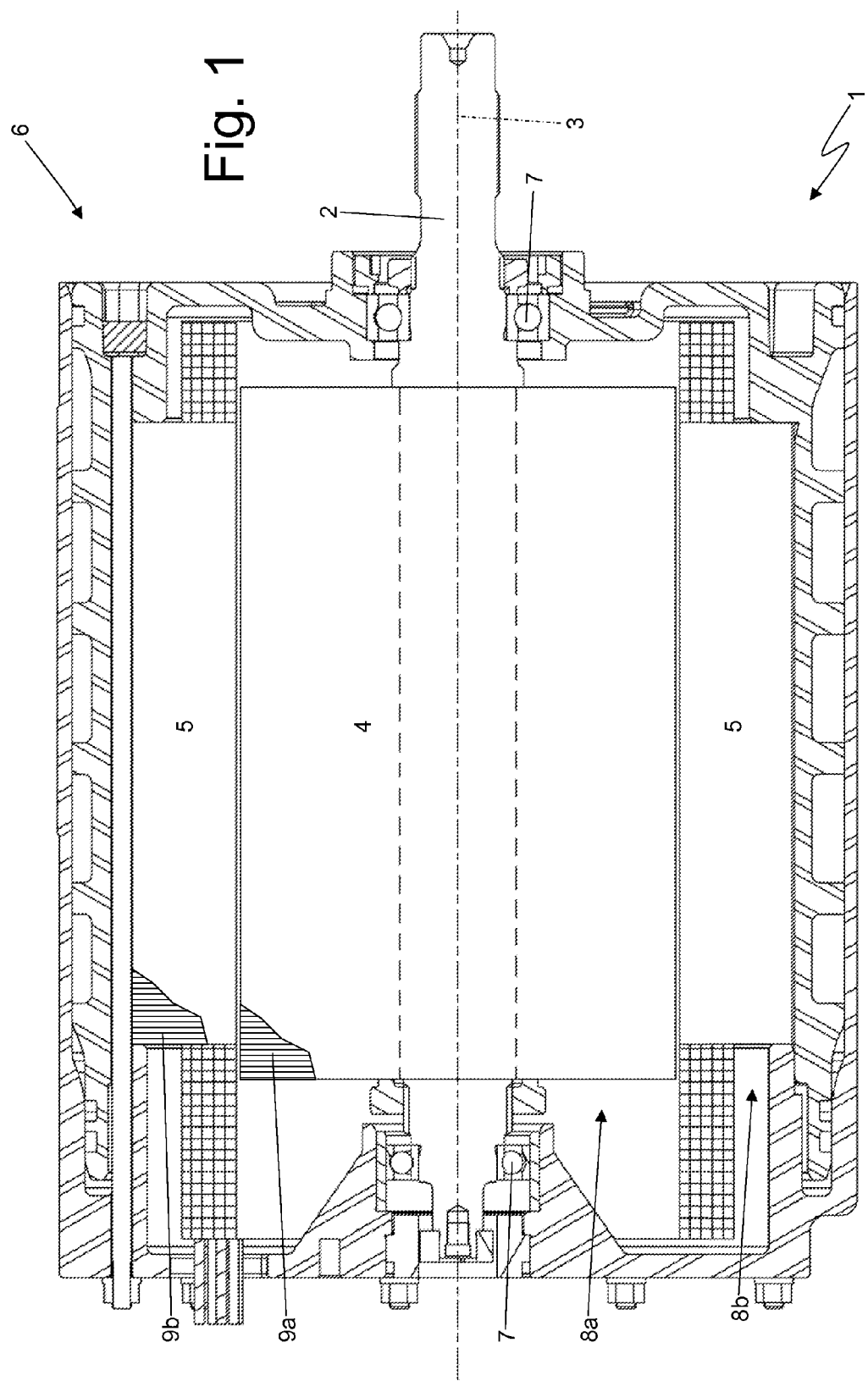

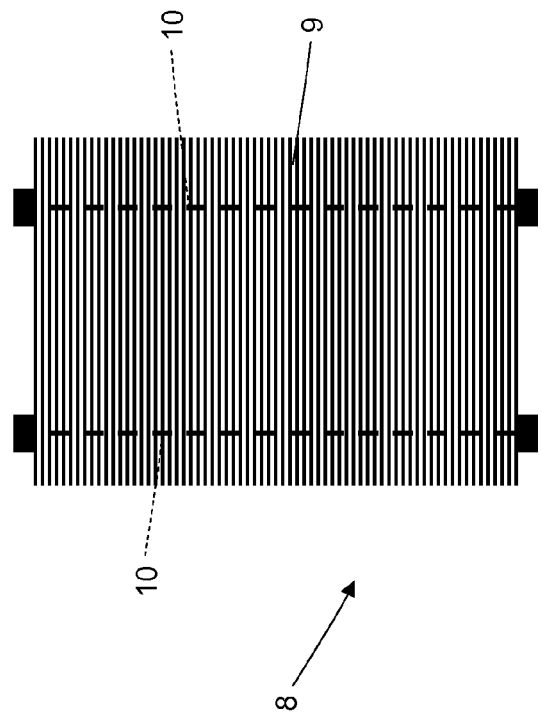
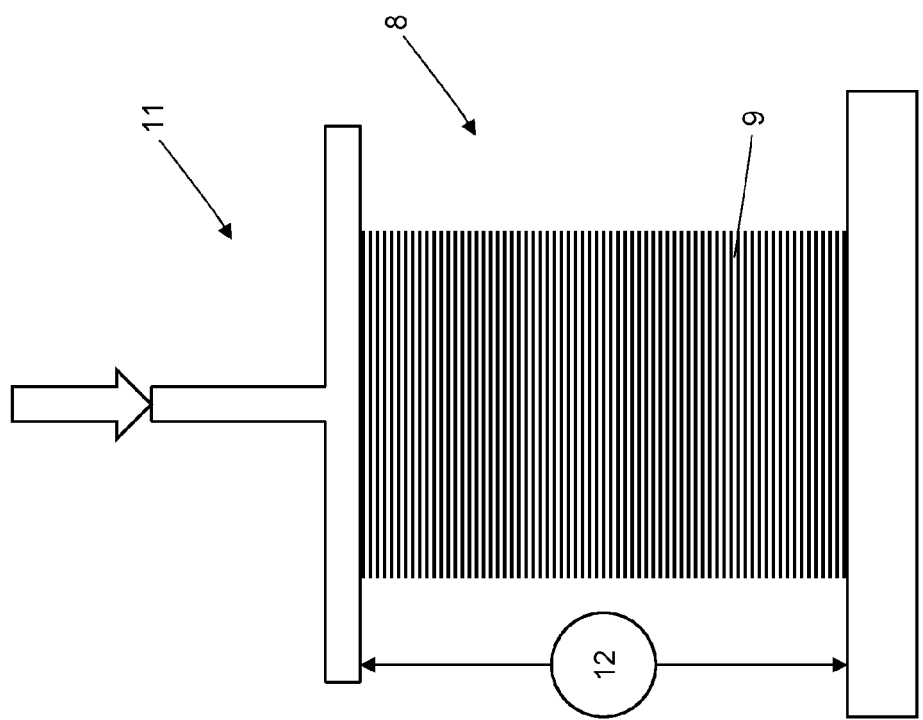
Fig. 5
Fig. 4

METHOD FOR BUILDING MAGNETIC CORE INCLUDING LAMINATIONS BOUND INTO PACKS FOR ELECTRICAL MACHINE

REFERENCE TO RELATED APPLICATION

This application claims benefit of the filing date of and priority to Italian Patent Application BO2011A 000058 filed on Feb. 10, 2011.

BACKGROUND OF INVENTION

1. Field of Invention

The invention relates to, generally, a method for building a magnetic core including laminations that are bound into packs for an electrical machine and, particularly, a rotating electrical machine for auto-traction.

2. Description of Related Art

Electric traction combined with traditional thermal traction to obtain hybrid traction is becoming increasingly popular in road vehicles. Electric traction requires the use of at least one rotating electrical machine that is normally reversible (i.e., that may operate both as electric motor by absorbing electrical power and generating mechanical driving torque, and as an electric generator by absorbing mechanical energy and generating electrical power) and is mechanically connected to the driving wheels of the vehicle by a transmission thereof.

One of the requirements by auto manufacturers wanting to make road cars with hybrid traction is a low dispersal of the nominal features of the rotating electrical machines, i.e., that the nominally identical rotating electrical machines also have the same actual features (obviously within a margin of tolerance that is to be the smallest possible). The constancy of the actual features of the nominally identical rotating electrical machines allows road vehicles with true performances to be made that are substantially equal to the nominal performances (i.e., the performances expected by the final customer). Moreover, the constancy of the actual features of nominally identical rotating electrical machines allows the control strategy of the electric traction system to be made more effective and reliable because the behaviour of the main object to be controlled (i.e., the rotating electrical machine that performs the electromechanical interaction) is more easily and accurately predictable.

However, it has been noted that by following the regular construction techniques of rotating electrical machines, the dispersal of nominal features is relatively high, and one of the most important elements determining such a dispersal is the variability of the ferromagnetic features of the magnetic core.

United States Patent Application Publication 2010/154968A1 describes a method for building a magnetic core consisting of laminations bound into packs, for an electrical machine; the building method provides: stacking a group of laminations one on top of the other to build the magnetic core; pre-compressing the group of laminations by a pre-compression press; measuring the actual axial length of the group of laminations while the group of laminations is compressed by the pre-compression press; comparing the actual axial length of the group of laminations with a desired axial length of the group of laminations; and, if the actual axial length is different from the desired axial length (while taking into consideration building and measurement tolerances), adding or removing a single lamination from the group of laminations and therefore repeating the above-described measuring cycle.

However, the building method proposed in U.S. Patent Application Publication 2010/154968A1 has various drawbacks because it requires a very long time to make the magnetic core, it may not be automated (i.e., it always requires manual intervention by an operator), and it could result in damaging the insulator between the laminations with a consequential increase, even significant, of losses of power due to eddy currents in the magnetic core during the operation of the electrical machine (i.e., a worsening of the energy efficiency of the electrical machine).

Thus, there is a need in the related art for a method for building a magnetic core including laminations bound into packs for an electrical machine that does not have the drawbacks described above. More specifically, there is a need in the related art for such a method that does not require a very long time to make the magnetic core, may be automated (i.e., it does not always require manual intervention by an operator), and does not result in damaging the insulator between the laminations with a consequential increase, even significant, of losses of power due to eddy currents in the magnetic core during the operation of the electrical machine (i.e., a worsening of the energy efficiency of the electrical machine). There is a need in the related art for such a method that also is easy and affordable to implement.

SUMMARY OF INVENTION

The invention overcomes the disadvantages in the related art in a method for building a magnetic core including laminations bound into packs for an electrical machine. The method comprises steps of: stacking a group of laminations one on top of the other to build the magnetic core; binding into a pack the group of laminations building the magnetic core by locking members that axially compress the group of laminations with a predetermined clamping force; pre-compressing, before clamping the pack by the locking members, the group of laminations by a pre-compression press that is independent and separate from the locking members; measuring an axial length of the group of laminations while the group of laminations is being compressed by the pre-compression press; initially forming the group of laminations with a normally lacking number of laminations to initially have the measured axial length that is lower than or substantially equal to a desired axial length; and adding, after having completed pre-compression, an additional number of laminations to the group of laminations determined according to a difference between the desired axial length and measured axial length.

One advantage of the method for building a magnetic core including laminations bound into packs for an electrical machine of the invention is that it does not require a very long time to make the magnetic core.

Another advantage of the method for building a magnetic core including laminations bound into packs for an electrical machine of the invention is that it is automated (i.e., it does not always require manual intervention by an operator).

Another advantage of the method for building a magnetic core including laminations bound into packs for an electrical machine of the invention is that it does not result in damaging the insulator between the laminations with a consequential increase, even significant, of losses of power due to eddy currents in the magnetic core during the operation of the electrical machine (i.e., a worsening of the energy efficiency of the electrical machine).

Another advantage of the method for building a magnetic core including laminations bound into packs for an electrical machine of the invention is that it is easy and affordable to implement.

Other objects, features, and advantages of the method for building a magnetic core including laminations bound into packs for an electrical machine of the invention are readily appreciated as the method become more understood while the subsequent detailed description of at least one embodiment of the method is read taken in conjunction with the accompanying drawing thereof.

BRIEF DESCRIPTION OF EACH FIGURE OF DRAWING

FIG. 1 is a diagrammatic longitudinal cross-section of a rotating electrical machine for auto-traction with parts thereof removed for clarity; and FIGS. 2-5 are four diagrammatic views of successive building steps of a magnetic core of the electrical machine shown in FIG. 1 according to an embodiment of the method for building a magnetic core including laminations bound into packs for an electrical machine of the invention.

DETAILED DESCRIPTION OF EMBODIMENT(S) OF INVENTION

Numeral 1 in FIG. 1 indicates, as a whole, a synchronous electrical machine for auto-traction of reversible type (i.e., it may operate both as an electric motor by absorbing electrical power and generating a mechanical driving torque, and as an electric generator by absorbing mechanical energy and generating electrical power). The electrical machine 1 comprises a shaft 2, which is rotatably mounted to rotate about a central axis of rotation 3, a rotor 4 with cylindrical-shaped permanent magnets and keyed to shaft 2 to rotate together with shaft 2, and a cylindrical tubular stator 5 arranged about rotor 4 to enclose rotor 4 itself therein. Stator 5 is inserted inside a cylindrical casing 6 that is holed in the middle to allow one end of shaft 2 to come out from it, and accommodates a pair of bearings 7 that rotatably support shaft 2.

Rotor 4 comprises a cylindrical-shaped magnetic core 8a that consists of a plurality of overlapping laminations 9a bound into packs; the group of laminations 9a forming the magnetic core 8a is kept bound in a pack by locking members 10 (shown in FIG. 5) of known type, which axially compress the group of laminations 9a with a predetermined clamping force; Similarly, rotor 5 comprises a toroidal-shaped magnetic core 8b that consists of a plurality of overlapping laminations 9b bound into packs; the group of laminations 9b forming the magnetic core 8b is kept bound in a pack by locking members 10 (shown in FIG. 5) of known type, which axially compress the group of laminations 9b with a predetermined clamping force.

With reference to FIGS. 2-5, the method will be described for building a magnetic core 8 consisting of laminations 9 bound into packs, of the electrical machine 1.

Figure 2:
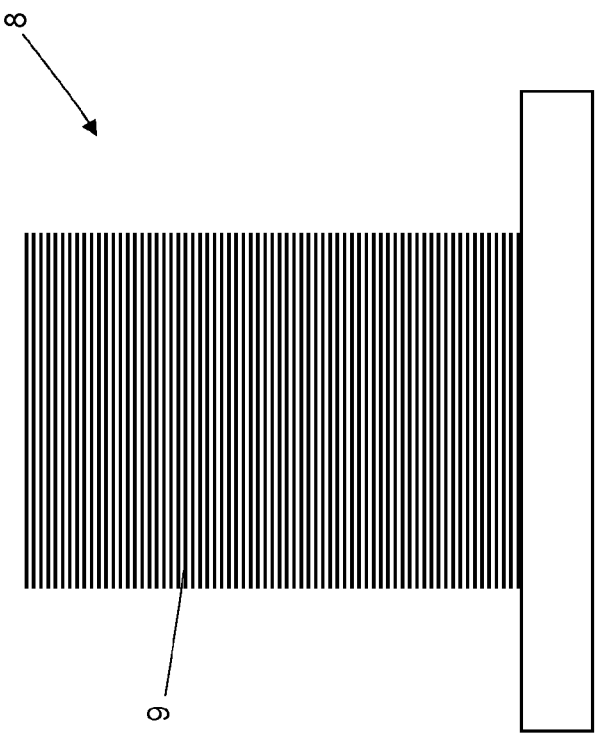

Initially, as shown in FIG. 2, the magnetic core 8 is built by stacking, one on top of the other, a group of laminations 9 consisting of an initial number N1 of laminations 9. When the formation of the magnetic core 8 is completed (i.e., when the group of laminations 9 consists of a final and permanent number N2 of laminations 9), the group of laminations 9 forming the magnetic core 8 will be bound into packs by the locking members 10 (shown in FIG. 5), which axially compress the group of laminations 9 with a predetermined clamping force F1.

As shown in FIGS. 3 and 4, before binding the group of laminations 9 into packs by the locking members (10), the group of laminations 9 is pre-compressed by a pre-compression press 11, which is independent and separate from the locking members 10 (i.e., is completely different from the locking members 10) by applying a compression force F2 to the group of laminations 9 that is greater than the clamping force F1.

As shown in FIG. 4, during the pre-compression, the axial length is measured of the group of laminations 9 while the group of laminations 9 is compressed by the pre-compression press 11 by using a precision measuring instrument 12. Hence, the number of laminations 9 forming the group of laminations 9 varies if the axial length measured under load (actual) is different from the desired axial length; in other words, the number of laminations 9 forming the group of laminations 9 is varied (regulated) to ensure that the axial length measured under load (i.e., during the pre-compression exerted by the pre-compression press 11) is (substantially) identical to the desired axial length. Obviously, to add laminations 9 from the group of laminations 9, there is a need to temporarily suspend the compression action exerted by the pre-compression press 11.

The group of laminations 9 is initially formed with an initial normally lacking number N1 of laminations 9 to initially have a measured axial length less than or at most equal to the desired axial length; thereby there is normally a need to add further laminations 9 (or, in the luckiest limiting case, there is no need to do anything because the measured axial length is already equal to the desired axial length), but there is never a need to remove laminations 9. Once a group of laminations 9 is pre-compressed together, in an embodiment, the laminations 9 that were pre-compressed are not removed so as not to modify the configuration that was achieved due to the pre-compression; moreover, removing some laminations 9 after pre-compression is extremely complex, because after pre-compression, the laminations 9 are "welded" together and finding the separation line between laminations 9 that thickness is a few tens of millimeters, is extremely complex.

According to an embodiment, the group of laminations 9 is initially built with a normally lacking number of laminations 9 to initially have a measured axial length (actual) that is less than or equal to the desired axial length; then, after having completed measuring the measured axial length (actual) and the pre-compression, an additional number of laminations 9 is added (always added, never removed) to the group of laminations 9, which is determined according to a difference between the desired axial length and the measured axial length (actual). Once the addition of "missing" laminations 9 has been made (which number is based on the difference between the desired axial length and the measured axial length), the group of laminations 9 forming the magnetic core 8 is bound into packs by locking members 10 without further pre-compression and/or measuring. In other words, one single measurement is performed of the measured axial length of the group of laminations 9 and one single addition is made of "missing" laminations 9 to the laminations 9; after having made the only single addition of "missing" laminations 9 to the group of laminations 9 forming the magnetic core 8, it is permanently bound into packs by the locking members 10 without further and/or additional pre-compression, measuring.

In an embodiment, a building tolerance is determined in advance, of the axial length of the laminations 9; such a building tolerance is typically within a certain percentage (e.g. 5%) and is provided and certified by the manufacturer of the laminations 9. Then, a maximum axial length is calculated of a single lamination 9 by adding the corresponding building tolerance to a nominal axial length of a single lamination 9, then the number N1 of laminations 9 is calculated with which to initially form the group of laminations 9, by dividing the desired axial length by the maximum axial length of a single lamination 9. Lastly, the number is calculated of additional laminations 9 to be added to the group of laminations 9, by dividing the difference between the desired axial length and the measured axial length by a nominal axial length of a single lamination 9.

Proving a numeric example, let us assume that a single lamination 9 has a nominal axial length (i.e., a thickness) equal to 0.35 mm, let us assume that the building tolerance of the laminations 9 is 5%, and let us assume that the desired axial length of the group of laminations 9 is equal to 350 mm; thereby the maximum axial length (i.e., the maximum thickness) of a single lamination 9 is equal to 0.3675 mm (=0.35*1.05) and the number N1 of laminations 9 with which the group of laminations 9 is initially formed is equal to 952 (=350/0.3675). In the absolute unluckiest case, i.e., if all the 952 laminations 9 have a minimum thickness possible equal to 0.3325 mm (=0.35*0.95), the measured axial length (actual) of the group of laminations 9 is equal to 316.54 mm (=952*0.3325); hence the difference between the desired axial length and the measured axial length (actual) is equal to 33.46 mm (=350−316.54) and hence the number of additional laminations 9 to be added to the group of laminations 9 is equal to 96 (=33.46/0.35). In this correction, the maximum error that may be made (again in the absolute unluckiest case) is 5%, i.e., is equal to 1.67 mm (=33.46*0.05), which corresponds to 0.5% of the desired axial length of the group of laminations 9; a maximum error (that only occurs in the very unlucky case in which all the operating errors are maximum and have the same sign for approximately one thousand laminations 9) of 0.5% of the desired axial length is quite acceptable and does not require any further corrective operation (i.e., the drawbacks of a further corrective operation outweigh the corresponding advantages).

According to an embodiment, after having activated the pre-compression press 11 the first time, a settling time interval is expected before measuring the axial length of the group of laminations 9 by the measuring instrument 12. Typically, the settling time interval is within some minutes.

According to an embodiment, the group of laminations 9 is removed from the pre-compression press 11 before applying the locking members 10, i.e., the locking members 10 are not applied while the group of laminations 9 is compressed by the pre-compression press 11. Thereby, it is possible to accurately calibrate the clamping force F1 exerted by the locking members 10 without the influence of the pre-compression action generated by the pre-compression press 11.

According to an embodiment, the compression force F2 exerted by the pre-compression press 11 is greater than the clamping force F1 exerted by the locking members 10; normally, the compression force F2 exerted by the pre-compression press 11 is at least five times higher (and, in an embodiment, ten times higher) than the clamping force F1 exerted by the locking members 10. By way of example, the compression force F2 exerted by the pre-compression press 11 ranges from 300 to 400 KNewton (corresponding to approximately 30-40 tons).

The above-described method for building the magnetic core 8 may be indifferently used for building the cylindrical magnetic core 8a of rotor 4, and/or for building the toroidal magnetic core 8b of stator 5.

The above-described method for building the magnetic core 8 has numerous advantages.

Firstly, the above-described method for building the magnetic core 8 is simple and affordable to achieve, because with respect to a conventional building method, it only provides the additional step of pre-compressing, by the pre-compression press 11, the group of laminations 9 forming the magnetic core 8 before applying the locking members 10.

The laminations 9 may have processing residuals (typically burrs formed during the trimming of the laminations 9 or localized fattening of the insulating paint covering the laminations 9) that result in an unwanted increase of the actual thickness; if the pre-compression action exerted by the pre-compression press 11 is not performed, the processing residuals may randomly and unpredictably modify the actual thickness of the laminations and hence groups of laminations 9 (i.e., magnetic cores 8) having a same axial length may consist of a different number of laminations 9 and hence have a different "mass" of ferromagnetic material (i.e., have different ferromagnetic features). It is also not possible to weigh the groups of laminations 9 (i.e., the magnetic cores 8) to ensure that the groups of laminations 9 (i.e., the magnetic cores 8) all have the same weight and different axial lengths, because it is necessary for all the groups of laminations 9 (i.e., the magnetic cores 8) to have the same axial length in order to be inserted into the corresponding casings 6 that are all the same as each other.

The pre-compression of the group of laminations 9 by the pre-compression press 11 allows the influence to be eliminated of the processing residuals of the laminations 9; indeed, the high pressure that is applied to the group of laminations 9 by the pre-compression press 11 "flattens" all the processing residuals of the laminations 9 thus in fact cancelling their negative action. Thereby, the groups of laminations 9 (i.e., the magnetic cores 8) with the same axial length always consist of a same number of laminations 9, i.e., of a same "mass" of ferromagnetic material with an obvious benefit in terms of containing the dispersals of the nominal features. In other words, due to the pre-compression action exerted by the pre-compression press 11, the different magnetic cores 8 are all identical to each other, both in terms of the same axial length, and in terms of the "mass" of ferromagnetic material.

The method has numerous advantages. Firstly, the above-described building method is easy to automate (i.e., completely achievable by an automated machine without intervention by an operator) because it always provides adding laminations to the magnetic core (operation that is easy to automate) and never provides removing laminations from the magnetic core (operation that is difficult to automate because after pre-compression, the laminations are "welded" together and finding the separation line between laminations thickness of which is a few tens of millimeters, is extremely complex).

Moreover, the above-described building method does not significantly damage the insulator between the laminations, because it provides performing a single cycle of compressing and releasing (i.e., ceasing compression) the magnetic core; indeed, with each cycle of compressing and releasing the magnetic core, it is possible (probable) that the residual processing burrs and/or any imperfections cause local damage to the insulator and by repeating the compression and releasing cycle several times, the damage progressively increases. In other words, by performing one single compression and releasing cycle, it is easy that the local damage to the insulator is only superficial and hence do not cause a complete local breakage in the insulator, but only the thinning thereof; instead, by performing several compression and releasing cycles, it becomes highly probable that the combined local damage to the insulator ends up completely piercing the insulator.

Lastly, the above-described building method requires a relatively short time for making the magnetic core, because it is completed after a single cycle of compressing and releasing the magnetic core.

It should be appreciated by those having ordinary skill in the related art that the method has been described above in an illustrative manner. It should be so appreciated also that the terminology that has been used above is intended to be in the nature of words of description rather than of limitation. It should be so appreciated also that many modifications and variations of the method are possible in light of the above teachings. It should be so appreciated also that, within the scope of the appended claims, the method may be practiced other than as specifically described above.

What is claimed is:

1. A method for building a magnetic core (8) including laminations (9) bound into packs for an electrical machine (1), said method comprising steps of:
    stacking a group of laminations (9) one on top of the other to build the magnetic core (8);
    binding into a pack the group of laminations (9) building the magnetic core (8) by locking members (10) that axially compress the group of laminations (9) with a predetermined clamping force;
    pre-compressing, before clamping the pack by the locking members (10), the group of laminations (9) by a pre-compression press (11) that is independent and separate from the locking members (10); and
    measuring an axial length of the group of laminations (9) while the group of laminations (9) is being compressed by the pre-compression press (11) and before binding the group of laminations (9) by the locking members (10);
    initially forming the group of laminations (9) with a normally lacking number of laminations (9) to initially have the measured axial length that is normally lower than a desired axial length;
    adding, after having completed pre-compression, an additional number of laminations (9) to the group of laminations (9) determined according to a difference between the desired axial length and measured axial length; and
    binding the group of laminations (9) forming the magnetic core (8) into packs by means of the locking members (10) after having added the additional laminations (9) to the group of laminations (9).

2. A building method as set forth in claim 1, said method comprising further steps of:
    taking one single measurement of the measured axial length of the group of laminations (9);
    making one single addition of "missing" laminations to the group of laminations (9); and binding the group of laminations (9) forming the magnetic core (8) into packs by locking members (10) after having added the additional laminations (9) to the group of laminations (9) without further at least one of pre-compression and measuring.

3. A building method as set forth in claim 1, wherein said method comprises further steps of:
    determining, in advance, a building tolerance of the axial length of the laminations (9);
    calculating a maximum axial length of a single lamination (9) by adding the corresponding building tolerance to a nominal axial length of a single lamination (9); and
    calculating the number of laminations (9) with which to initially form the group of laminations (9) by dividing the desired axial length by the maximum axial length of a single lamination (9).

4. A building method as set forth in claim 1, wherein said method comprises a further step of calculating the number of additional laminations (9) by dividing the difference between the desired axial length and the measured axial length by a nominal axial length of a single lamination (9).

5. A building method as set forth in claim 1, wherein said method comprises a further step of waiting, after having activated the pre-compression press (11), for a settling time interval before measuring the axial length of the group of laminations (9).

6. A building method as set forth in claim 1, wherein said method comprises a further step of removing the group of laminations (9) from the pre-compression press (11) before applying the locking members (10).

7. A building method as set forth in claim 1, wherein the compression force exerted by the pre-compression press (11) is higher than the clamping force exerted by the locking members (10).

8. A building method as set forth in claim 7, wherein the compression force exerted by the pre-compression press (11) is substantially at least five times higher than the clamping force exerted by the locking members (10).

9. A building method as set forth in claim 7, wherein the compression force exerted by the pre-compression press (11) is substantially at least ten times higher than the clamping force exerted by the locking members (10).

10. A building method as set forth in claim 7, wherein the compression force exerted by the pre-compression press (11) ranges from substantially 300 to 400 kNewtons.

* * * * *